US011968351B2

(12) United States Patent
Chen

(10) Patent No.: US 11,968,351 B2
(45) Date of Patent: Apr. 23, 2024

(54) THREE-DIMENSIONAL IMAGING METHOD AND SYSTEM USING SCANNING-TYPE COHERENT DIFFRACTION

(71) Applicant: National Tsing Hua University, Hsinchu (TW)

(72) Inventor: Chien-Chun Chen, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 189 days.

(21) Appl. No.: 17/845,210

(22) Filed: Jun. 21, 2022

(65) Prior Publication Data
US 2023/0199162 A1 Jun. 22, 2023

(30) Foreign Application Priority Data
Dec. 16, 2021 (TW) .................. 110147201

(51) Int. Cl.
H04N 13/254 (2018.01)
G02B 27/42 (2006.01)
H04N 13/106 (2018.01)
H04N 13/207 (2018.01)

(52) U.S. Cl.
CPC ....... H04N 13/254 (2018.05); G02B 27/4227 (2013.01); H04N 13/106 (2018.05); H04N 13/207 (2018.05)

(58) Field of Classification Search
CPC .. H04N 13/254; H04N 13/106; H04N 13/207; G02B 27/4227
USPC .......................................... 348/49
See application file for complete search history.

(56) References Cited

U.S. PATENT DOCUMENTS

2021/0199586 A1* 7/2021 Zhou .................. G02B 21/14
2021/0310788 A1* 10/2021 Zawadzki ............ G01B 9/0201
2021/0374381 A1* 12/2021 Ozcan .................. G06V 10/82

FOREIGN PATENT DOCUMENTS

CN 104536125 A 4/2015
CN 107703642 A 2/2018

* cited by examiner

Primary Examiner — Tung T Vo
(74) Attorney, Agent, or Firm — Birch, Stewart, Kolasch & Birch, LLP

(57) ABSTRACT

In a 3D imaging method using scanning-type coherent diffraction, a 2D photodetector detects diffraction of a coherent beam emitted from a light source that moves in a scanning manner toward a sample object to obtain multiple 2D diffraction data distributions; and a processor converts the 2D diffraction data distributions into multiple 3D intensity distributions in a reciprocal space, performs one or more iterations based on a sample function, a light source function and the 3D intensity distributions to obtain a phase-retrieval sample function, and generates a 3D reconstruction image of the sample object based on the phase-retrieval sample function.

10 Claims, 8 Drawing Sheets

1st 2D reconstruction image

1st 2D section of predetermined structural model

THREE-DIMENSIONAL IMAGING METHOD AND SYSTEM USING SCANNING-TYPE COHERENT DIFFRACTION

CROSS-REFERENCE TO RELATED APPLICATION

This application claims priority of Taiwanese Invention Patent Application No. 110147201, filed on Dec. 16, 2021.

FIELD

The disclosure relates to three-dimensional (3D) image reconstruction, and more particularly to a 3D imaging method and a 3D imaging system that use scanning-type coherent diffraction.

BACKGROUND

A conventional method to produce a 3D image reconstruction of a sample object is to first irradiate the sample object with high-intensity coherent light (e.g., X-ray, laser, beam of electrons, etc.) that can penetrate the sample object; to rotate the sample object multiple times so that the angle of the sample object relative to the incident coherent light is at different predetermined rotation angles at different times; to use a two-dimensional (2D) photosensor module to collect 2D diffraction patterns of the sample object in different orientations (at said different rotation angles); to use the Fourier slice theorem to obtain a 2D projection image for each of the angles by performing inverse Fourier transform for the 2D diffraction pattern (including phase information) that corresponds to the angle; and to use tomographic reconstruction to perform image reconstruction with the 2D projection images, so as to obtain a 3D image of the sample object.

Before performing the tomographic reconstruction, it is necessary to correct a common axis of rotation for the 2D projection images of the different rotation angles, and this correction step uses cross-correlation that may induce cumulative errors. In addition, the sample object placed on a loading platform must undergo multiple procedures such as rotation, rotation angle calibration, data processing, etc., thus causing the whole process to be relatively cumbersome and time-consuming. Particularly, when the rotation angle of the loading platform is greater than a certain angle (e.g., 70°, which may cause the orientation of the loading platform to be close to the incident direction of the coherent light beam), a 2D diffraction pattern that corresponds to the rotation angle or a greater angle may be unattainable, so the obtained 2D diffraction patterns for the sample object may be incomplete. In another aspect, the conventional method requires the light spot of the coherent light beam to have a size greater than the sample object, thereby significantly limiting the use of the conventional method on objects with a large size. Furthermore, since the coherent light beam must penetrate the entire sample object many times in the conventional method, the entire sample object may be irreversibly damaged because of the relatively long-term high-intensity light irradiation.

SUMMARY

Therefore, developing a 3D imaging method that is relatively convenient and time-saving, and/or that can minimize the damage of light irradiation for the purpose of 3D image reconstruction to a sample object has become a goal in the related technical field.

An object of the disclosure is to provide a 3D imaging method that uses scanning-type coherent diffraction and that can alleviate at least one of the drawbacks of the prior art.

According to the disclosure, the 3D imaging method includes steps of: (A) by a light source that is moved relative to a sample object to N number of scanning positions one by one in a scanning manner, emitting, at each of the scanning positions, a coherent light beam toward the sample object while having a same orientation to form a light spot on the sample object, so as to define N number of light spot regions on the sample object that respectively correspond to the N number of the scanning positions, wherein N is a positive integer, and any adjacent two of the light spot regions partly overlap each other; (B) by a 2D photodetector, detecting, for the coherent light beam emitted by the light source at each of the scanning positions, diffraction of the coherent light beam that passes through the corresponding one of the light spot regions, so as to obtain N number of 2D diffraction data distributions that respectively correspond to the scanning positions; (C) by a processor, using a mathematical coordinate transformation to map all data points of each of the 2D diffraction data distributions onto a 3D spherical coordinate system to generate a pair of spherical shells that are symmetric with respect to an origin of the 3D spherical coordinate system, and presenting all data points on one of the spherical shells in a 3D Cartesian coordinate system of a reciprocal space, so as to obtain N number of 3D intensity distributions in the reciprocal space, each of the 3D intensity distributions corresponding to one of the scanning positions to which the 2D diffraction data distribution corresponds, and being represented as $I_{j,q}^M$, where j is an integer ranging from 1 to N; (D) by the processor, performing, for each value of j from 1 to N, an iteration based on a sample function $O_{j,r}$ is related to a 3D structure of the sample object, a light source function $P_{j,r}$ that is related to a structure of the light spot regions, and the 3D intensity distributions that respectively correspond to the scanning positions, so as to obtain a sample reconstruction function candidate and a light source reconstruction function candidate that correspond to the iteration, wherein the iteration includes operations of (i) performing Fourier transform on a wave function $\psi_{j,r}$ to obtain a distribution data $\varphi_{j,q}$ for the reciprocal space, where the wave function $\psi_{j,r}$ is defined as a product of the sample function $O_{j,r}$ and the light source function $P_{j,r}$; (ii) updating the distribution data $\varphi_{j,q}$ in terms of amplitude based on one of the 3D intensity distributions $I_{j,q}^M$ that corresponds to the $j^{th}$ one of the scanning positions, so as to obtain an updated distribution data $\varphi'_{j,q}$; (iii) performing inverse Fourier transform on the updated distribution data $\varphi'_{j,q}$ to obtain an updated wave function for a real space; (iv) obtaining an updated sample function $O'F_{j,r}$ and an updated light source function $P'_{j,r}$ based on the sample function $O_{j,r}$, the light source function $P_{j,r}$ and the updated wave function $\psi'_{j,r}$; (v) when j≠N, repeating operations (i) to (iv) for a next value of j with the updated sample function $O'_{j,r}$ and the updated light source function $P'_{j,r}$ respectively serving as the sample function $O_{j,r}$ and the light source function $P_{j,r}$ for operation (i) in the repetition of operations (i) to (iv); and (vi) when j=N, making the updated sample function $O'_{j,r}$ and the updated light source function $P'_{j,r}$ obtained in operation (iv) for j=N respectively serve as the sample reconstruction function candidate and the light source reconstruction function candidate for the iteration; (E) by the processor, determining whether the sample reconstruction function candidate satisfies a predetermined convergence condition; (F) by the processor, upon determining in step (E) that the sample reconstruction function candidate does not satisfy the predetermined convergence condition, repeating steps (D) and (E) with the sample reconstruction function candidate and the light source reconstruction function candidate respectively serving as the sample function $O_{j,r}$ and the light source function $P_{j,r}$ for operation (i) in the repetition of step (D) when j=1; and (G) by the processor, after determining in step (E) that the sample reconstruction function candidate satisfies the predetermined convergence condition, making the sample reconstruction function candidate serve as a sample reconstruction function, executing a predetermined 3D graphics program to generate, based on the sample reconstruction function, a 3D envelope curved surface that corresponds to a specific value included in the sample reconstruction function, and that serves as a 3D reconstruction image of the sample object, and displaying the 3D reconstruction image on a display module.

Another object of the disclosure is to provide a 3D imaging system that uses scanning-type coherent diffraction and that can alleviate at least one of the drawbacks of the prior art.

According to the disclosure, the 3D imaging system is provided to reconstruct a 3D image for a sample object, and includes a light source, a light source driver module, a 2D photodetector, a processor and a display module. The light source is movable on a movement plane that faces a surface of the sample object in a spacing direction, and is operable to emit a coherent light beam toward the surface of the sample object while having a specific orientation. The light source driver module is configured to drive movement of the light source to N number of scanning positions on the movement plane one by one in a scanning manner, so that the light source, at each of the scanning positions, emits the coherent light beam toward the sample object while having the specific orientation to form a light spot on the sample object, thereby defining N number of light spot regions on the sample object that respectively correspond to the N number of the scanning positions, where N is a positive integer, and any adjacent two of the light spot regions partly overlap each other. The 2D photodetector is disposed to detect, for the coherent light beam emitted by the light source at each of the scanning positions, diffraction of the coherent light beam that passes through the corresponding one of the light spot regions, so as to obtain N number of 2D diffraction data distributions that respectively correspond to the scanning positions, wherein the movement plane, the sample object and the 2D photodetector are arranged along the spacing direction. The processor is electrically connected to the 2D photodetector for receiving the 2D diffraction data distributions, and includes a coordinate transformation module, an iteration module, a convergence determination module and a reconstruction module. The coordinate transformation module is configured to use a mathematical coordinate transformation to map all data points of each of the 2D diffraction data distributions onto a 3D spherical coordinate system to generate a pair of spherical shells that are symmetric with respect to an origin of the 3D spherical coordinate system, and is configured to present all data points on one of the spherical shells in a 3D Cartesian coordinate system of a reciprocal space, so as to obtain N number of 3D intensity distributions in the reciprocal space. Each of the 3D intensity distributions corresponds to one of the scanning positions to which the 2D diffraction data distribution corresponds, and is represented as $I_{j,q}^M$, where j is an integer from 1 to N. The iteration module is configured to perform, for each value of j from 1 to N, an iteration based on a sample function $O_{j,r}$ that is related to a 3D structure of the sample object, a light source function $P_{j,r}$ related to a structure of the light spot regions, and the 3D intensity distributions that respectively correspond to the scanning positions, so as to obtain a sample reconstruction function candidate and a light source reconstruction function candidate that correspond to the iteration. The iteration includes operations of: (i) performing Fourier transform on a wave function $\psi_{j,r}$ to obtain a distribution data $\varphi_{j,q}$ for the reciprocal space, where the wave function $\psi_{j,r}$ is defined as a product of the sample function $O_{j,r}$ and the light source function $P_{j,r}$; (ii) updating the distribution data $\varphi_{j,q}$ in terms of amplitude based on one of the 3D intensity distributions $I_{j,q}^M$ that corresponds to the $j^{th}$ one of the scanning positions, so as to obtain an updated distribution data $\varphi'_{j,q}$; (iii) performing inverse Fourier transform on the updated distribution data $\varphi'_{j,q}$ to obtain an updated wave function $\psi'_{j,r}$ for a real space; (iv) obtaining an updated sample function $O'_{j,r}$ and an updated light source function $P'_{j,r}$ based on the sample function $O_{j,r}$, the light source function $P_{j,r}$ and the updated wave function $\psi'_{j,r}$; (v) when j≠N, repeating operations (i) to (iv) for a next value of j with the updated sample function $O'_{j,r}$ and the updated light source function $P'_{j,r}$ respectively serving as the sample function $O_{j,r}$ and the light source function $P_{j,r}$ for operation (i) in the repetition of operations (i) to (iv); and (vi) when j=N, making the updated sample function $O'_{j,r}$ and the updated light source function $P'_{j,r}$ obtained in operation (iv) for j=N respectively serve as the sample reconstruction function candidate and the light source reconstruction function candidate of the iteration. The convergence determination module configured to determine whether the sample reconstruction function candidate satisfies a predetermined convergence condition, to, upon determining that the sample reconstruction function candidate does not satisfy the predetermined convergence condition, cause the iteration module to repeat the iteration with the sample reconstruction function candidate and the light source reconstruction function candidate respectively serving as the sample function $O_{j,r}$ and the light source function $P_{j,r}$ for operation (i) in the repetition of the iteration, and to, after determining that the sample reconstruction function candidate satisfies the predetermined convergence condition, make the sample reconstruction function candidate serve as a sample reconstruction function that is a phase-retrieval sample function. The reconstruction module is configured to execute a predetermined 3D graphics program to generate, based on the sample reconstruction function, a 3D envelope curved surface that corresponds to a specific value included in the sample reconstruction function, and that serves as a 3D reconstruction image of the sample object. The display module is electrically connected to the processor, and is operable by the processor to display the 3D reconstruction image.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
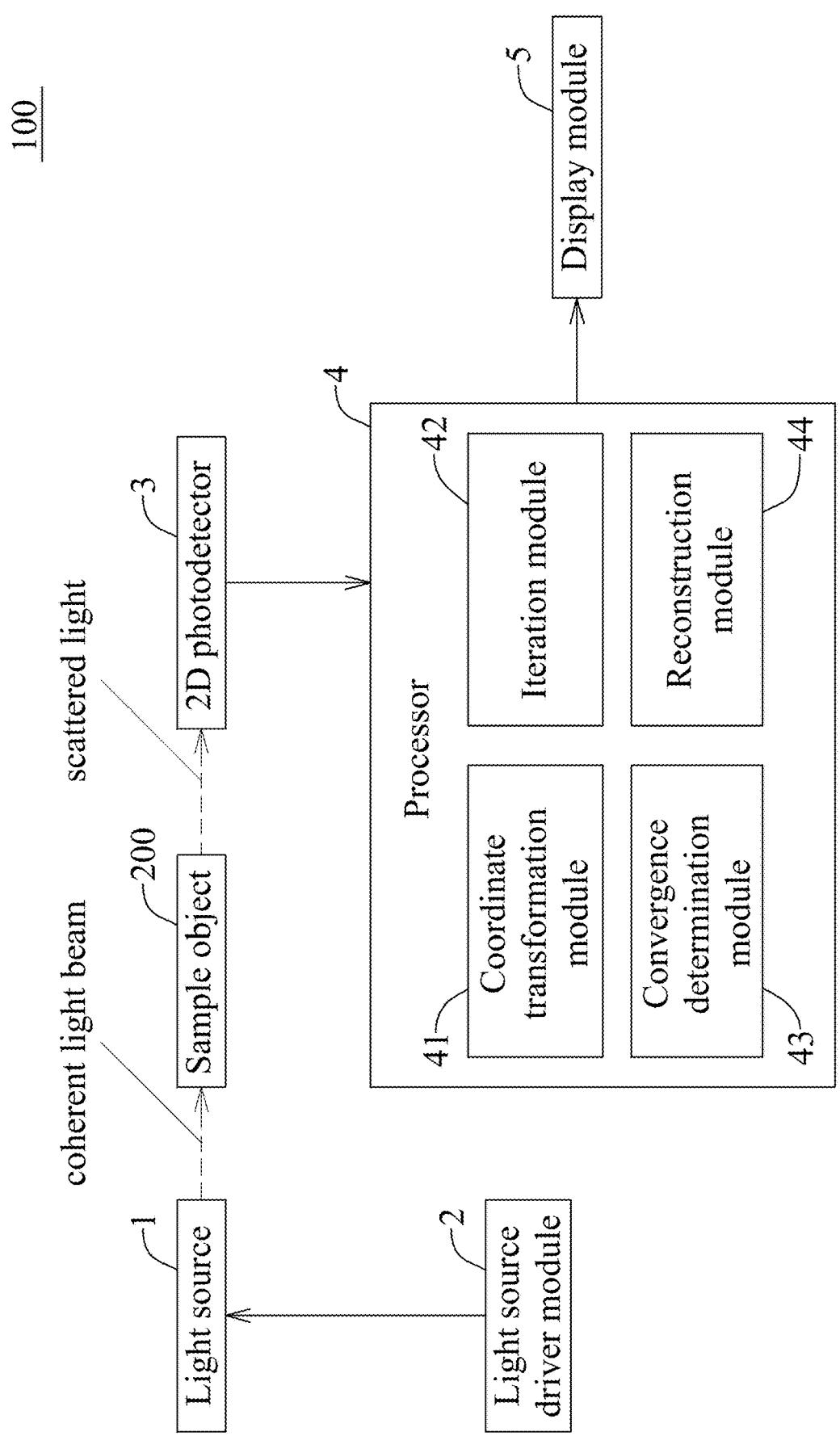
FIG. 1 is a block diagram illustrating an embodiment of a 3D imaging system using scanning-type coherent diffraction according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a 3D imaging system 100 using scanning-type coherent diffraction according to this disclosure is adapted to reconstruct a 3D image for a sample object 200, and includes a light source 1, a light source driver module 2, a 2D photodetector 3, a processor 4 and a display module 5. The sample object 200 may be, for example but not limited to, a semiconductor product that is usually in a sheet form and that has relatively flat surfaces from a macroscopic perspective.

The light source 1 is movable relative to the sample object 200 on a movement plane that faces a surface 201 of the sample object 200 in a spacing direction, and is operable to emit a coherent light beam, which may be a high-intensity X-ray beam, toward the sample object 200 while having a specific, fixed orientation (namely, the coherent light beam coming from the light source 1 is fixed at a specific direction relative to the light source 1 and does not change even if the relative positions between the light source 1 and the sample object 200 changes). Further referring to FIG. 3, in this embodiment, the coherent light beam emitted by the light source 1 passes through a pin hole 10, and is incident on the surface 201 of the sample object 200.

Figure 3:
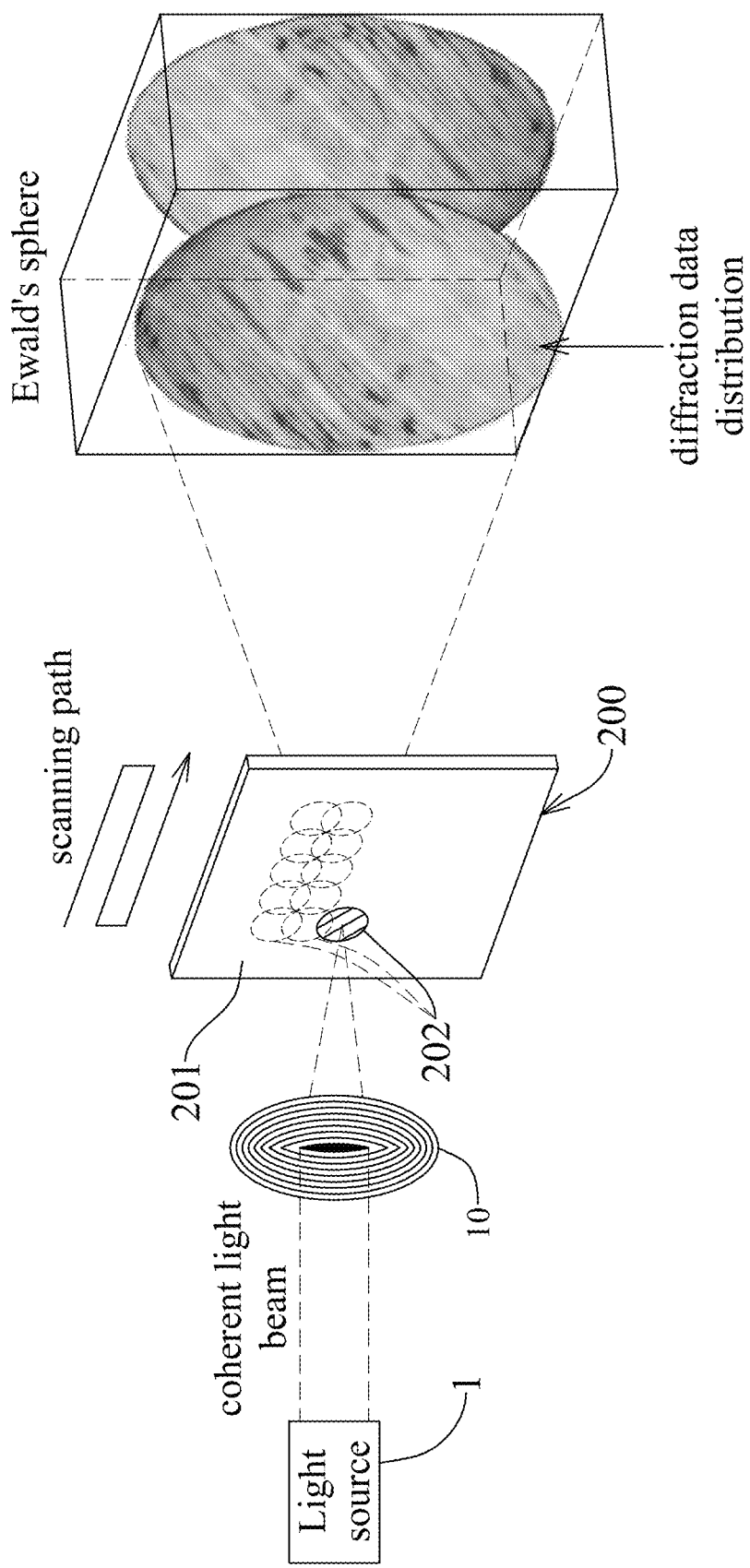
FIG. 3 is a schematic diagram illustrating that a 2D diffraction data distribution obtained by a light source emitting a coherent light beam onto a light spot region of a sample object is mapped onto a 3D spherical coordinate system of the Ewald's sphere to generate a pair of spherical shells.

The light source driver module 2 is configured to drive movement of the light source 1 and the pin hole 10 to N number of scanning positions on the movement plane one by one in a scanning manner, wherein N is a positive integer and can be determined based on a size of a part of the sample object 200 that requires image reconstruction. In this embodiment, the N number of the scanning positions are located on the movement plane along a scanning path as shown in FIG. 3, but this disclosure is not limited in this respect. At each of the scanning positions, the light source 1 emits the coherent light beam toward the sample object 200 when in the same specific orientation to form a light spot on the sample object 200, thereby defining N number of light spot regions 202 on the sample object 200, where the N number of the light spot regions 202 respectively correspond to the N number of the scanning positions, and any adjacent two of the light spot regions 202 partly overlap each other. In this embodiment, the light spot regions 202 are disposed on the surface 201. In some embodiments where a distance of two adjacent scanning positions is in the scale of micrometers, the light source driver module 2 may be a microelectromechanical system (MEMS) driver that includes a micro motor.

The 2D photodetector 3 may be realized as, for example, a charge-coupled device (CCD) array, and is disposed to detect scattered light from the sample object 200. In this embodiment, the movement plane, the sample object 200 and the 2D photodetector 3 are arranged along the spacing direction.

The processor 4 is electrically connected to the 2D photodetector 3 for receiving data therefrom, and includes a coordinate transformation module 41, an iteration module 42, a convergence determination module 43 and a reconstruction module 44, each of which may be realized as one or more firmware/software programs composed of a plurality of instructions.

The display module 5 may be realized as a display screen, and is electrically connected to and operable by the processor 4.

Figure 2:
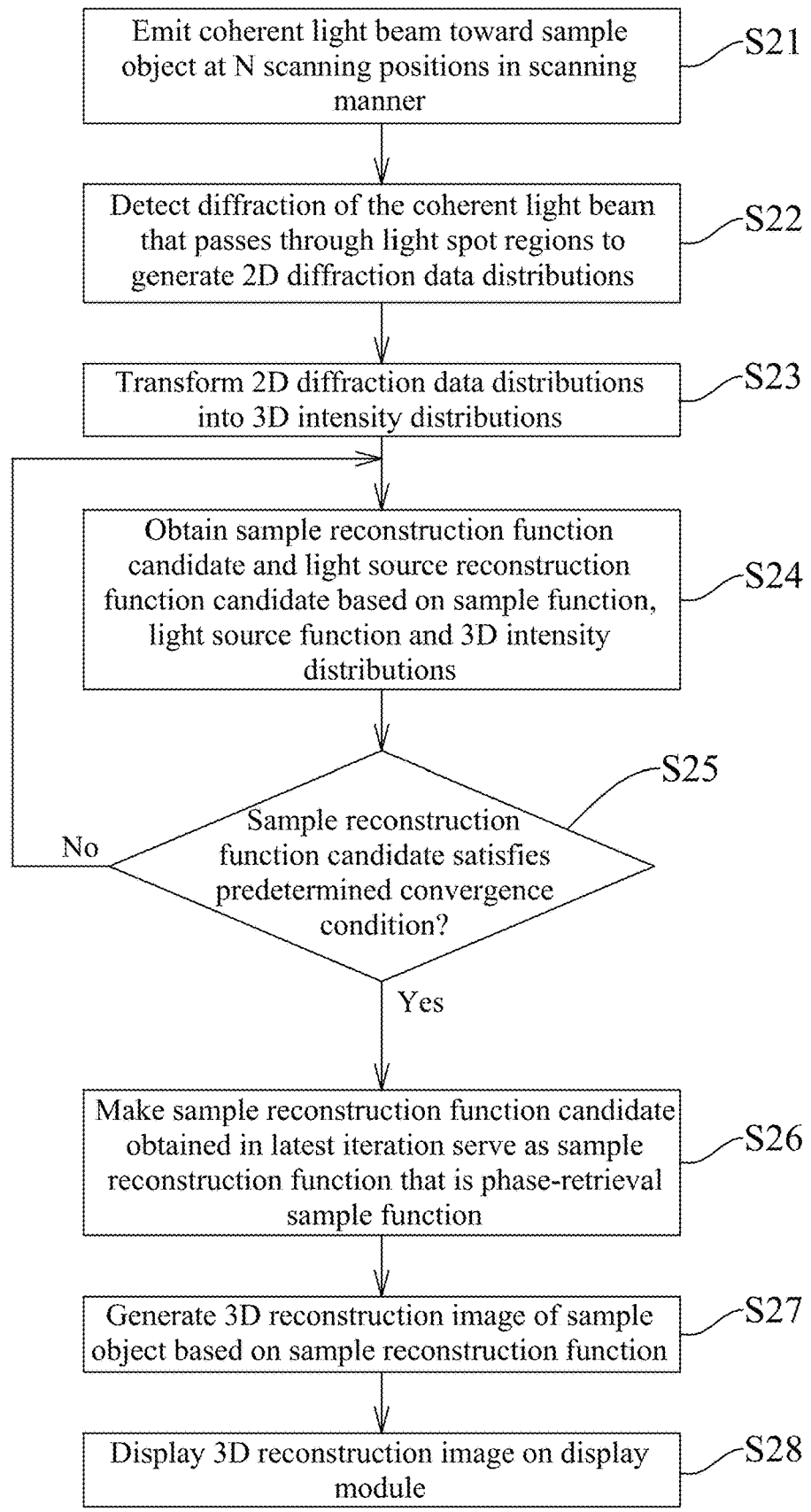
FIG. 2 is a flow chart illustrating steps of an embodiment of a 3D imaging method according to the disclosure.

Further referring to FIG. 2, an embodiment of a 3D imaging method that is implemented by the 3D imaging system 100 is shown to include steps S21 to S28.

In step S21, the light source driver module 2 drives the light source 1 to move in a scanning manner to the scanning positions along the scanning path. During the movement of the light source 1, the 2D photodetector 3 detects, for the coherent light beam emitted by the light source 1 at each of the scanning positions, diffraction of the coherent light beam that passes through the corresponding one of the light spot regions 202 (i.e., the region on which the diffracted coherent light beam is illuminated), so as to obtain N number of 2D diffraction data distributions that respectively correspond to the scanning positions and that are outputted to the processor 4. Each of the 2D diffraction data distributions may be presented in a form of a 2D grayscale pattern that represents a distribution of the diffraction of the coherent light beam in terms of light intensity. In comparison to the conventional method for collecting light intensity information (which may require rotation of the sample object, correction of a common axis of rotation, etc.), the embodiment collects the 2D diffraction data distributions in a scanning manner, which is relatively easy, convenient, and time-saving. In addition, since the 2D diffraction data distributions are collected by scanning the light spot regions 202 each being much smaller than the sample object 200 in size, the embodiment is applicable for use on sample objects of any size, and damage to the sample objects from light irradiation can be significantly reduced.

Before the process proceeds to step S23, the processor 4 may use a conventional background noise processing method to filter out background noises from each of the 2D diffraction data distributions, so as to promote accuracy of the data. For example, the background noise processing may include with respect to each of the 2D diffraction data distributions, a step of calculating an average of data that correspond to a rectangular area at the upper left corner in the 2D diffraction data distribution, a step of adding three standard deviations of the 2D diffraction data distribution to the average to generate a background noise value, and a step of subtracting the background noise value from each data value of the 2D diffraction data distribution. However, this disclosure is not limited in this respect.

In step S23, the coordinate transformation module 41 uses a mathematical coordinate transformation to map all data points of each of the 2D diffraction data distributions onto a 3D spherical coordinate system (e.g., the Ewald's sphere) to generate a pair of spherical shells that are symmetric with respect to an origin of the 3D spherical coordinate system, and presents all data points on one of the spherical shells in a 3D Cartesian coordinate system of a reciprocal space (i.e., the Fourier space), so as to obtain N number of 3D intensity distributions in the reciprocal space, where each of the 3D intensity distributions corresponds to one of the scanning positions to which the 2D diffraction data distribution corresponds. Herein, each of the 3D intensity distributions is represented as Imo, where j is an integer ranging from 1 to N, q represents coordinates in the reciprocal space, and M represents experimental measurements and does not represent any number or value.

In this embodiment, for each of the 2D diffraction data distributions, coordinates of each data point of the 2D diffraction data distribution in a 2D Fourier space is represented by $(k'_x, k'_y)$, and each data point of the corresponding 3D intensity distribution in a 3D Fourier space is represented by $(k_x, k_y, k_z)$. A data point of the 2D diffraction data distribution and the corresponding data point of the 3D intensity distribution have the following relationships:

$$k_x = \frac{Rk'_x}{\sqrt{R^2 + k_x'^2 + k_y'^2}}$$

$$k_y = \frac{Rk'_y}{\sqrt{R^2 + k_x'^2 + k_y'^2}}$$

$$k_z = R\left(1 - \frac{R}{\sqrt{R^2 + k_x'^2 + k_y'^2}}\right).$$

where R is a reciprocal of a wavelength of the coherent light beam, namely, a radius of the Ewald's sphere.

In step S24, the iteration module 42 performs, for each value of j from 1 to N, an iteration based on a sample function $O_{j,r}$ (where r represents coordinates in a real space) that is related to a 3D structure of the sample object 200, a light source function $P_{j,r}$ that is related to a structure of the light spot regions 202, and the 3D intensity distributions $I_{1,q}^M, I_{2,q}^M, \ldots, I_{N,q}^M$ that respectively correspond to the scanning positions, so as to obtain a sample reconstruction function candidate and a light source reconstruction function candidate that correspond to the iteration.

Figure 4:
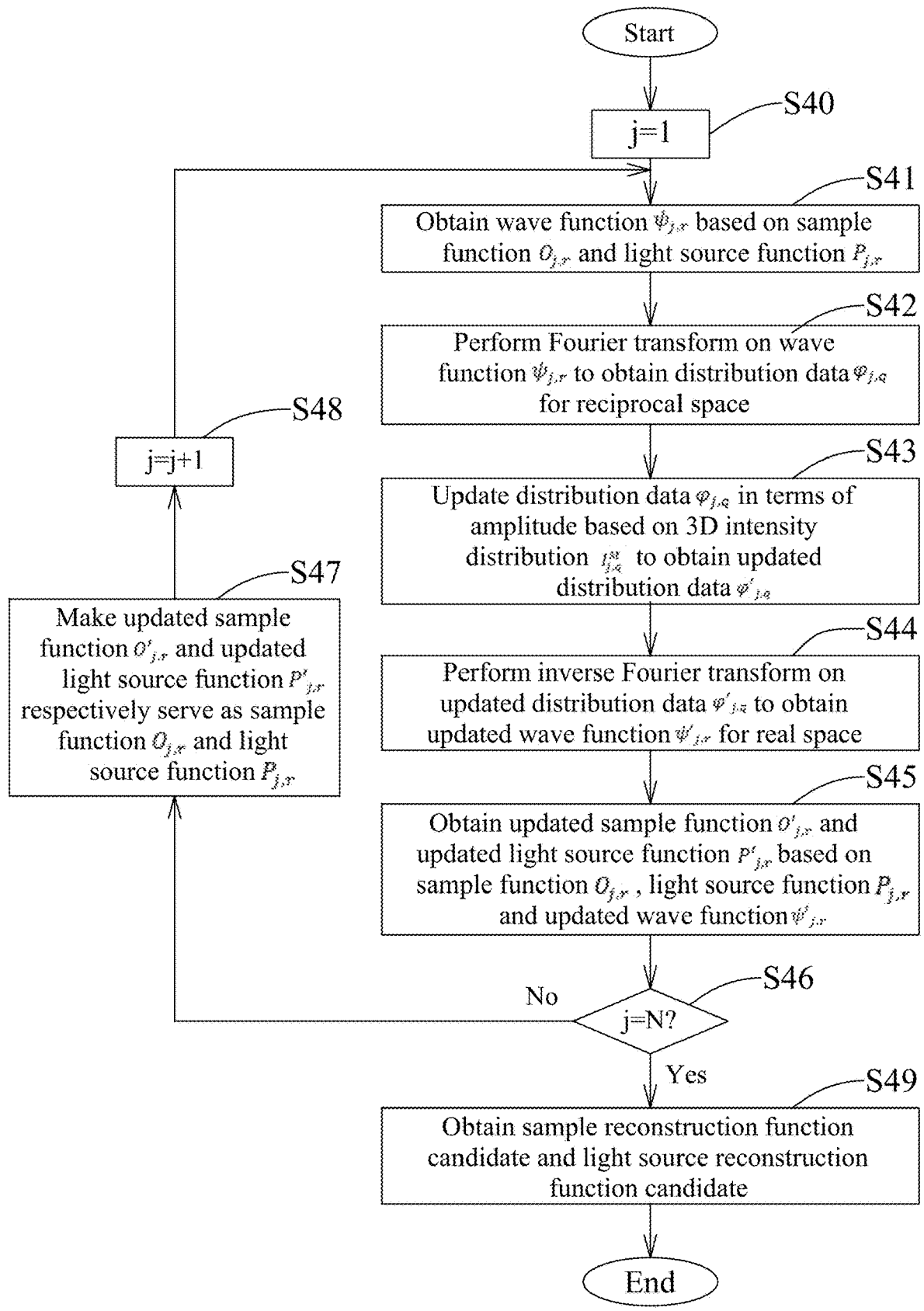
FIG. 4 is a flow chart illustrating iteration operations to be implemented by the 3D imaging system.

Referring to FIGS. 1 and 4, details of the iteration are illustrated to include operations S40 to S49.

In operation S40, the iteration module 42 makes j=1. In this embodiment, for the first time the iteration is performed and when j=1, the sample function $O_{j,r}$ and the light source function $P_{j,r}$ are respectively an initial sample function $O_0$ and an initial light source function $P_0$ that are generated in a predetermined manner (referred to as predetermined initial sample function $O_0$ and predetermined initial light source function $P_0$ hereinafter). For example, each of the initial sample function $O_0$ and an initial light source function $P_0$ may be a predetermined 3D matrix, but this disclosure is not limited in this respect. In practice, each of the sample function $O_{j,r}$ and the light source function $P_{j,r}$ may be a function of a 3D matrix, but this disclosure it not limited in this respect.

In operation S41, the iteration module 42 defines a wave function $\psi_{j,r}$ based on the sample function $O_{j,r}$ and the light source function $P_{j,r}$, wherein the wave function $\psi_{j,r}$ is related to an electromagnetic wave exiting from the sample object 200. In this embodiment, the wave function $\psi_{j,r}$ may be defined as a product of the sample function $O_{j,r}$ and the light source function $P_{j,r}$ (e.g., $\psi_{j,r} = O_{j,r} \times P_{j,r}$).

In operation S42, the iteration module 42 performs Fourier transform on the wave function $\psi_{j,r}$ to obtain a distribution data $\varphi_{j,q}$ for the reciprocal space, namely, $\varphi_{j,q} = \mathcal{F}\{\psi_{j,r}\}$.

In operation S43, the iteration module 42 updates the distribution data $\varphi_{j,q}$ in terms of amplitude based on one of the 3D intensity distributions $I_{j,q}^M$ that corresponds to the $j^{th}$ one of the scanning positions, so as to obtain an updated distribution data $\varphi'_{j,q}$. In detail, the 3D intensity distribution $I_{j,q}^M$, the distribution data $\varphi_{j,q}$ and the updated distribution data $\varphi'_{j,q}$ have a relationship of:

$$\varphi'_{j,q} = \sqrt{I_{j,q}^M} \frac{\varphi_{j,q}}{\sqrt{I_{j,q}}}$$

where $\sqrt{I_{j,q}}$ represents amplitude information of the distribution data $\varphi_{j,q}$. In other words, the iteration module 42 replaces the amplitude information of the distribution data $\varphi_{j,q}$ with amplitude information (i.e., a root of intensity information) of the 3D intensity distribution, which results from transforming intensity information collected by the 2D photodetector 3 into the Fourier space.

In operation S44, the iteration module 42 performs inverse Fourier transform on the updated distribution data $\varphi'_{j,q}$ to obtain an updated wave function $\psi'_{j,r}$ for the real space, namely, $\psi'_{j,r} = \mathcal{F}\{\varphi'_{j,q}\}$.

In operation S45, the iteration module 42 uses predetermined formulas to obtain an updated sample function $O'_{j,r}$, and an updated light source function $P'_{j,r}$ based on the sample function $O_{j,r}$, the light source function $P_{j,r}$, the updated wave function $\psi'_{j,r}$, and a predetermined algorithm (e.g. the ptychographic iterative engine, PIE). In this embodiment, the predetermined formulas are defined as:

$$O'_{j,r} = O_{j,r} + \alpha \frac{P^*_{j,r}}{|P_{j,r}|^2_{max}}(\psi'_{j,r} - \psi_{j,r})$$

$$P'_{j,r} = P_{j,r} + \beta \frac{O^*_{j,r}}{|O_{j,r}|^2_{max}}(\psi'_{j,r} - \psi_{j,r})$$, where each of $\alpha$ and $\beta$ is a predetermined parameter (e.g., $\alpha = 1$ and $\beta = 1$), $O_{j,r}^*$ represents a set of complex conjugates of all elements of the sample function $O_{j,r}$, and $P_{j,r}^*$ represents a set of complex conjugates of all elements of the light source function $P_{j,r}$.

In operation S46, the iteration module 42 determines whether j=N. When j≠N (e.g., j=1 and N>1), operations S42 to S45 are repeated for the next value of j with the updated sample function $O'_{j,r}$ and the updated light source function $P'_{j,r}$ respectively serving as the sample function $O_{j,r}$ and the light source function $P_{j,r}$ for operation S42 in the repetition of operations S42 to S45. In detail, when the iteration module 42 determines that j≠N in operation S46, the flow goes to operation S47.

In operation S47, the iteration module 42 makes the updated sample function $O'_{j,r}$ and the updated light source function $P'_{j,r}$ respectively serve as the sample function $O_{j,r}$ and the light source function $P_{j,r}$ for a subsequent repetition of operations S42 to S45. In operation S48, the iteration module 42 adds one to j, namely, making j=j+1, and the flow returns to S41.

As a result, after operations S41 to S48 for j=1, the iteration module 42 repeats operations S41 to S48 for j=2, j=3, ..., and j=N−1 in sequence. Then, after a repetition of operations S41 to S45 for j=N, the iteration module 42 determines that j=N in step S46, and the flow goes to operation S49.

In operation S49, the iteration module 42 makes the updated sample function $O'_{j,r}$ and the updated light source function $P'_{j,r}$ obtained in operation S45 for j=N respectively serve as the sample reconstruction function candidate and the light source reconstruction function candidate for the iteration. A single iteration is completed at this point, and the flow goes to step S25.

Referring to FIGS. 1 and 2, in step S25, the convergence determination module 43 determines whether the sample reconstruction function candidate obtained in step S24 satisfies a predetermined convergence condition. The flow goes to step S26 when the determination is affirmative, and returns to step S24 when otherwise. In this embodiment, the predetermined convergence condition includes that an error rate between the sample reconstruction function candidate obtained in the latest iteration and the sample function $O_{j,r}$ used in the latest iteration (referred to as kth iteration) when j=1 (i.e., the sample reconstruction function candidate obtained in the iteration that is immediately before the latest iteration, namely, the $(k-1)^{th}$ iteration, or the predetermined initial sample function $O_0$ when the latest iteration is the first iteration) is smaller than a predetermined threshold. To be specific, the error rate can be defined to be:

$$err = \frac{|O_{m+1} - O_m|}{|O_m|},$$

where err represents the error rate for an $(m+1)^{th}$ iteration, m is an integer not smaller than zero, and $O_{m+1}$ represents the sample reconstruction function candidate obtained in the $(m+1)^{th}$ iteration; and when m=0, $O_m=O_0$, representing the predetermined initial sample function. In this embodiment, the predetermined threshold may be set to 0.1%, but this disclosure is not limited in this respect.

In detail, when determining that the sample reconstruction function candidate does not satisfy the predetermined convergence condition in step S25, the convergence determination module 43 causes the iteration module 42 to repeat the iteration with the sample reconstruction function candidate and the light source reconstruction function candidate respectively serving as the sample function $O_{j,r}$ and the light source function $P_{j,r}$ for operation S42 in the repetition of the iteration (i.e., step S24). When determining that the sample reconstruction function candidate obtained in the latest iteration satisfies the predetermined convergence condition in step S25, the flow goes to step S26, where the convergence determination module 43 makes the sample reconstruction function candidate serve as a sample reconstruction function that is a phase-retrieval sample function for the sample object 200. In other words, the sample reconstruction function candidate may converge to an acceptable level (i.e., satisfying the predetermined convergence condition) after one or more iterations, and the resultant sample reconstruction function can successfully retrieve phase information that is absent in the predetermined initial sample function.

Furthermore, in some embodiments that require reconstruction of the 3D structure of the light spot regions resulting from the coherent light beam illuminated onto the sample object 200, the convergence determination module 43 may further determine, in step S25, whether the light source reconstruction function candidate obtained in step S24 satisfies the predetermined convergence condition. In a similar manner, a light source reconstruction function that is a phase-retrieval light source function can be obtained for reconstruction of the 3D structure of the light spot regions.

In step S27, the reconstruction module 44 executes a predetermined 3D graphics program (e.g., having a surface rendering function to plot an isosurface, such as Amira, MATLAB, etc.) to generate a reconstruction image based on the sample reconstruction function. In some embodiments, the reconstruction module 44 generates a 2D reconstruction image of the sample object 200 based on the sample reconstruction function and coordinates information that is related to a specific section of the sample object 200, where the 2D reconstruction image is an image of the specific section of the sample object 200. In some embodiments, the reconstruction module 44 generates a 3D reconstruction image of the sample object 200 based on the sample reconstruction function and a specific value (e.g., a value corresponding to a specific property, such as a material property) included in the sample reconstruction function, where the 3D reconstruction image is a 3D envelope curved isosurface that corresponds to the specific value. In some embodiments, the reconstruction module 44 generates a 3D reconstruction image of the sample object 200 based on the sample reconstruction function, coordinates information that is related to a specific 3D portion of the sample object 200, and a specific value included in the sample reconstruction function, where the 3D reconstruction image is a 3D envelope curved isosurface of the specific 3D portion of the sample object 200 that corresponds to the specific value. Similarly, the reconstruction module 44 can also generate a 2D/3D reconstruction image for the light spot regions based on the light source reconstruction function in a similar manner.

In step S28, the processor 4 causes the display module 5 to display the 2D/3D reconstruction image for checking by relevant personnel, such as a technician who is in charge of inspecting the sample object 200.

Figure 5:
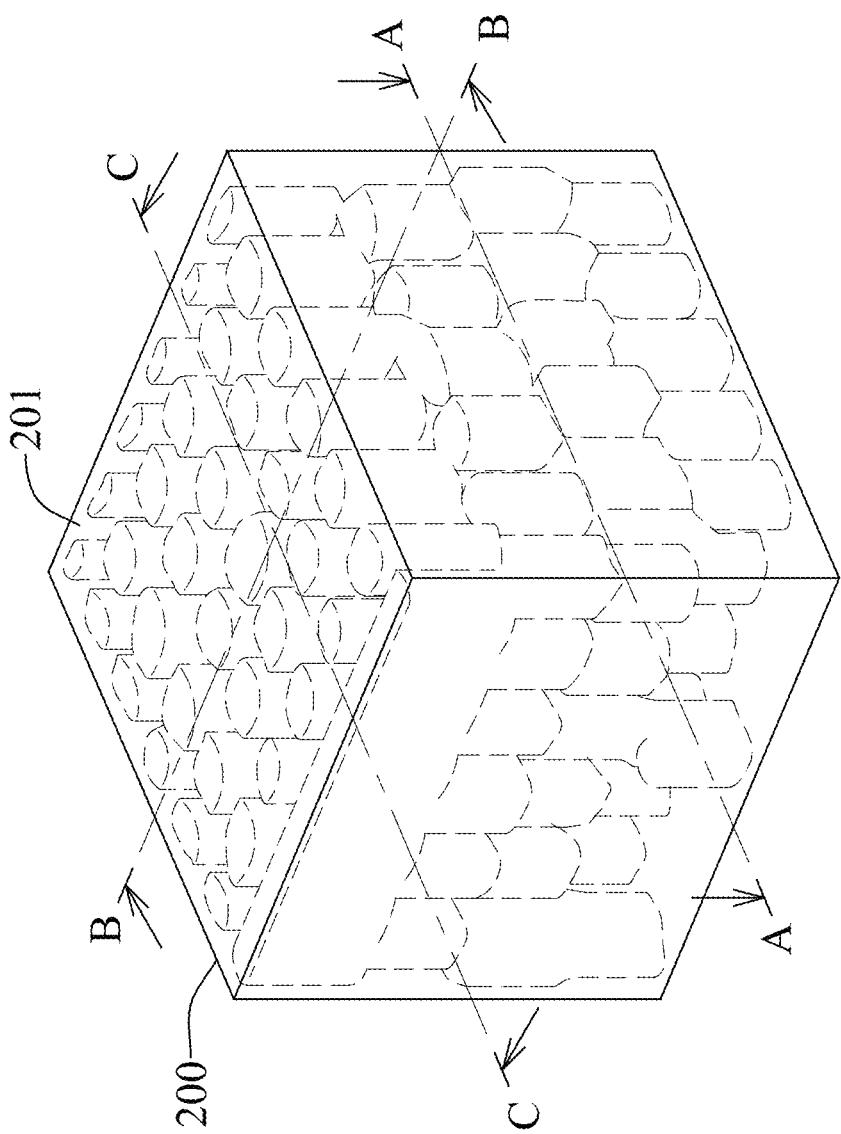
FIG. 5 is a perspective view illustrating a predetermined structural model included in an exemplary sample object.
Figure 6:
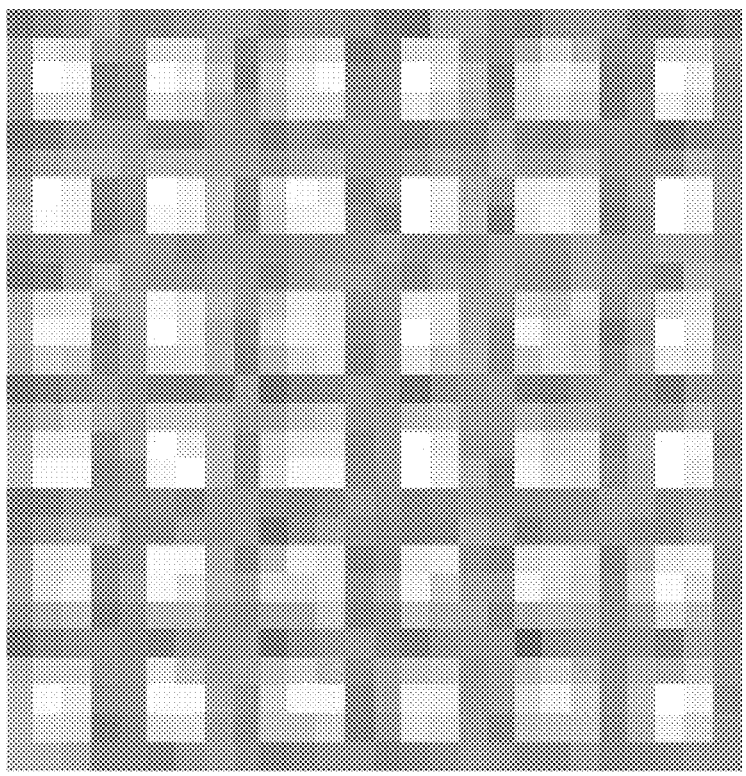
FIG. 6 shows a first 2D section of the predetermined structural model taken along line A-A in FIG. 5, and a first 2D reconstruction image that is obtained using the embodiment of the 3D imaging system and that corresponds to the first 2D section.
Figure 6:
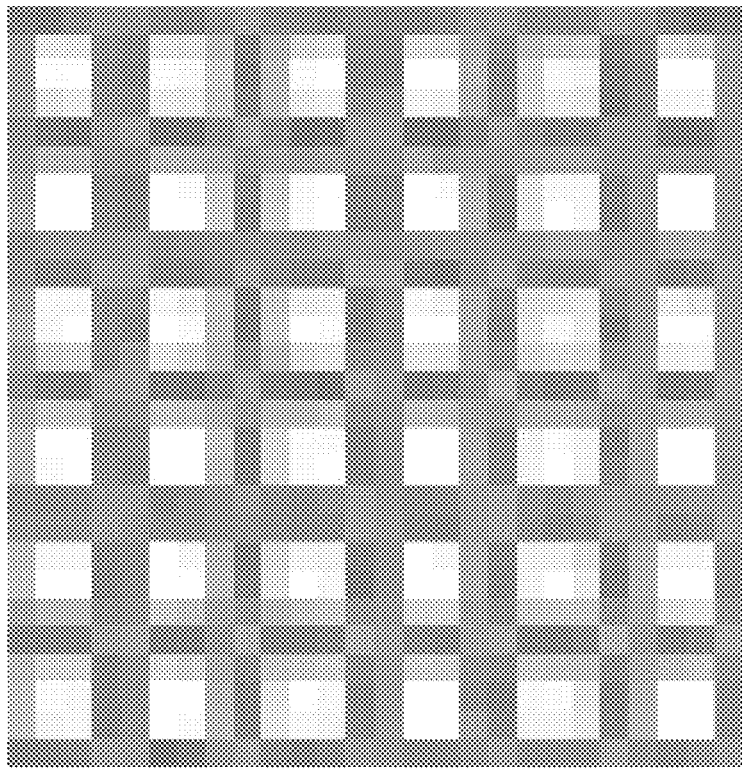
Figure 7:
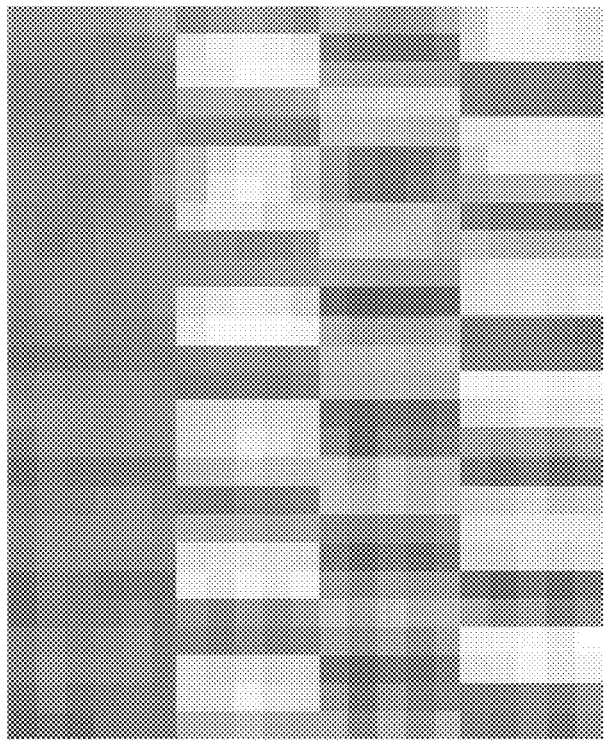
FIG. 7 shows a second 2D section of the predetermined structural model taken along line B-B in FIG. 5, and a second 2D reconstruction image that is obtained using the embodiment of the 3D imaging system and that corresponds to the second 2D section.
Figure 7:
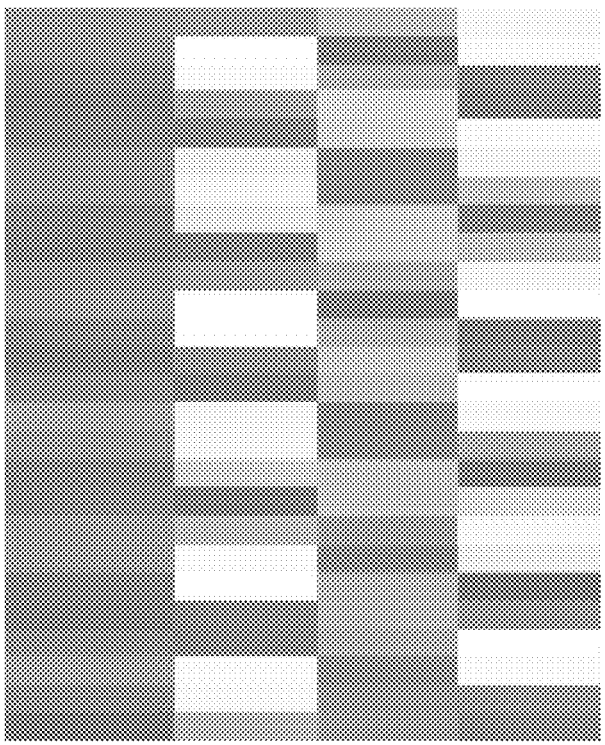
Figure 8:
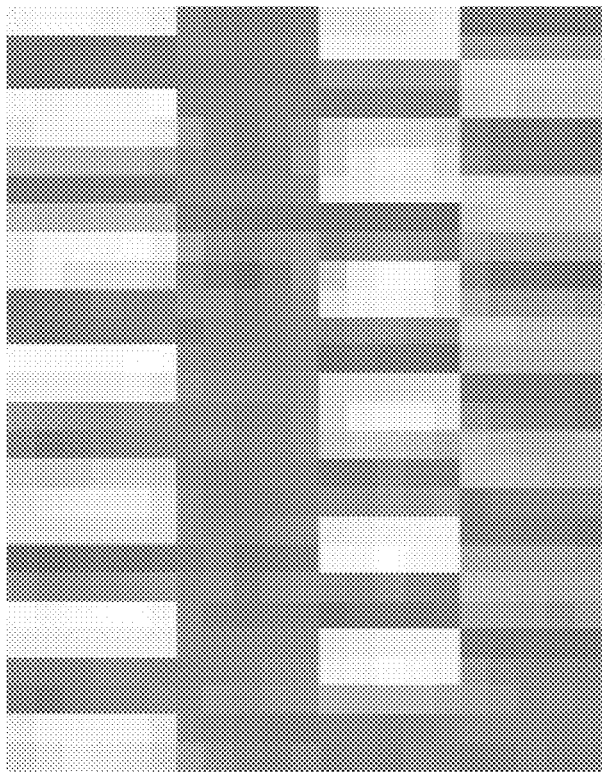
FIG. 8 shows a third 2D section of the predetermined structural model taken along line C-C in FIG. 5, and a third 2D reconstruction image that is obtained using the embodiment of the 3D imaging system and that corresponds to the third 2D section.
Figure 8:
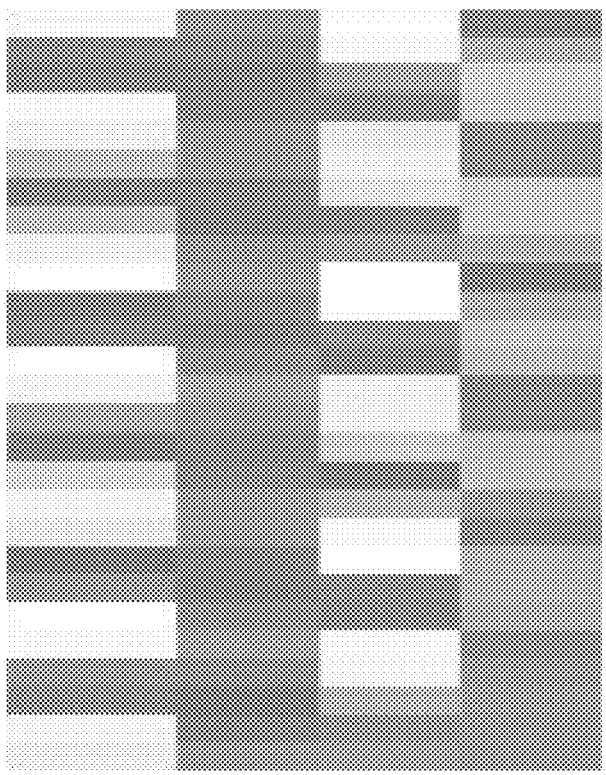

FIG. 5 illustrates a predetermined 3D structural model that corresponds to a specific material in an exemplary sample object 200. A left part of FIG. 6 illustrates a first 2D section of the predetermined 3D structural model taken along line A-A in FIG. 5. A right part of FIG. 6 illustrates a first 2D reconstruction image generated using the sample reconstruction function (i.e., the phase-retrieval sample function) obtained by the embodiment of the 3D imaging system 100, where the first 2D reconstruction image corresponds to the first 2D section of the predetermined 3D structural model. A left part of FIG. 7 illustrates a second 2D section of the predetermined 3D structural model taken along line B-B in FIG. 5. A right part of FIG. 7 illustrates a second 2D reconstruction image generated using the sample reconstruction function, where the second 2D reconstruction image corresponds to the second 2D section of the predetermined 3D structural model. A left part of FIG. 8 illustrates a third 2D section of the predetermined 3D structural model taken along line C-C in FIG. 5. A right part of FIG. 7 illustrates a third 2D reconstruction image generated using the sample reconstruction function, where the third 2D reconstruction image corresponds to the third 2D section of the predetermined 3D structural model. According to FIGS.

6 through 8, the 3D imaging system 100 of this disclosure is capable of reconstructing an approximate 2D/3D structure of the sample object 200.

In summary, the 3D imaging system 100 according to this disclosure changes the position of the light source 1 relative to the sample object 200 to collect the 2D diffraction data distributions of the sample object 200 while the light source 1 is maintained at a single orientation. Then, the 2D diffraction data distributions are mapped onto the spherical shells of the Ewald's sphere, and all data points on one of the spherical shells are presented in a 3D Cartesian coordinate system of the reciprocal space to obtain the 3D intensity distributions. One or more iterations are performed based on the 3D intensity distributions to obtain the phase-retrieval sample function (and the phase-retrieval light source function in some embodiments), so as to reconstruct an image of a 2D/3D structure of the sample object 200. The method implemented by the 3D imaging system 100 is relatively easy, convenient and time-saving in terms of collecting the 2D diffraction data distributions that are sufficient to achieve phase retrieval, and overcomes an issue that the conventional method is unable to obtain the 2D diffraction patterns of all angles. In addition, since the 2D diffraction data distributions are collected by scanning the light spot regions 202 each being much smaller than the sample object 200 in size, the embodiment is applicable for use on sample objects of any size, and damage to the sample objects from light irradiation can be minimized.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure. While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A three-dimensional (3D) imaging method using scanning-type coherent diffraction, comprising steps of:
   (A) by a light source that is moved relative to a sample object to N number of scanning positions one by one in a scanning manner, emitting, at each of the scanning positions, a coherent light beam toward the sample object while having a same orientation to form a light spot on the sample object, so as to define N number of light spot regions on the sample object that respectively correspond to the N number of the scanning positions, wherein N is a positive integer, and any adjacent two of the light spot regions partly overlap each other;
   (B) by a two-dimensional (2D) photodetector, detecting, for the coherent light beam emitted by the light source at each of the scanning positions, diffraction of the coherent light beam that passes through the corresponding one of the light spot regions, so as to obtain N number of 2D diffraction data distributions that respectively correspond to the scanning positions;
   (C) by a processor, using a mathematical coordinate transformation to map all data points of each of the 2D diffraction data distributions onto a 3D spherical coordinate system to generate a pair of spherical shells that are symmetric with respect to an origin of the 3D spherical coordinate system, and presenting all data points on one of the spherical shells in a 3D Cartesian coordinate system of a reciprocal space, so as to obtain N number of 3D intensity distributions in the reciprocal space, each of the 3D intensity distributions corresponding to one of the scanning positions to which the 2D diffraction data distribution corresponds, and being represented as $I_{j,q}^M$, where j is an integer ranging from 1 to N;
   (D) by the processor, performing, for each value of j from 1 to N, an iteration based on a sample function $O_{j,r}$ that is related to a 3D structure of the sample object, a light source function $P_{j,r}$ that is related to a structure of the light spot regions, and the 3D intensity distributions that respectively correspond to the scanning positions, so as to obtain a sample reconstruction function candidate and a light source reconstruction function candidate that correspond to the iteration, wherein the iteration includes operations of
      (i) performing Fourier transform on a wave function $\psi_{j,r}$ to obtain a distribution data $\varphi_{j,q}$ for the reciprocal space, where the wave function $\psi_{j,r}$ is defined as a product of the sample function $O_{j,r}$ and the light source function $P_{j,r}$;
      (ii) updating the distribution data $\varphi_{j,q}$ in terms of amplitude based on one of the 3D intensity distributions $I_{j,q}^M$ that corresponds to the $j^{th}$ one of the scanning positions, so as to obtain an updated distribution data $\varphi'_{j,q}$;
      (iii) performing inverse Fourier transform on the updated distribution data $\varphi'_{j,q}$ to obtain an updated wave function $\psi'_{j,r}$ for a real space;
      (iv) obtaining an updated sample function $O'_{j,r}$ and an updated light source function $P'_{j,r}$ based on the sample function $O_{j,r}$, the light source function $P_{j,r}$ and the updated wave function $\psi'_{j,r}$;
      (v) when j≠N, repeating operations (i) to (iv) for a next value of j with the updated sample function $O'_{j,r}$ and the updated light source function $P'_{j,r}$ respectively serving as the sample function $O_{j,r}$ and the light source function $P_{j,r}$ for operation (i) in the repetition of operations (i) to (iv); and
      (vi) when j=N, making the updated sample function $O'_{j,r}$ and the updated light source function $P'_{j,r}$ obtained in operation (iv) for j=N respectively serve as the sample reconstruction function candidate and the light source reconstruction function candidate for the iteration;
   (E) by the processor, determining whether the sample reconstruction function candidate satisfies a predetermined convergence condition;
   (F) by the processor, upon determining in step (E) that the sample reconstruction function candidate does not satisfy the predetermined convergence condition, repeating steps (D) and (E) with the sample reconstruction function candidate and the light source reconstruction function candidate respectively serving as the sample function $O_{j,r}$ and the light source function $P_{j,r}$ for operation (i) in the repetition of step (D) when j=1; and (G) by the processor, after determining in step (E) that the sample reconstruction function candidate satisfies the predetermined convergence condition, making the sample reconstruction function candidate serve as a sample reconstruction function, executing a predetermined 3D graphics program to generate, based on the sample reconstruction function, a 3D envelope curved surface that corresponds to a specific value included in the sample reconstruction function, and that serves as a 3D reconstruction image of the sample object, and displaying the 3D reconstruction image on a display module.

2. The 3D imaging method of claim 1, wherein, in operation (ii), one of the 3D intensity distributions $I_{j,q}^{M}$, the distribution data $\varphi_{j,q}$ and the updated distribution data $\varphi'_{j,q}$ have a relationship of:

$$\varphi'_{j,q} = \sqrt{I_{j,q}^{M}} \frac{\varphi_{j,q}}{\sqrt{I_{j,q}}},$$

where $\sqrt{I_{j,q}}$ represents amplitude information of the distribution data $\varphi_{j,q}$;

wherein, in operation (iv), the updated sample function $O'_{j,r}$ is defined to be:

$$O'_{j,r} = O_{j,r} + \alpha \frac{P^*_{j,r}}{|P_{j,r}|^2_{max}} (\psi'_{j,r} - \psi_{j,r}),$$

and
the updated light source function $P'_{j,r}$ is defined to be:

$$P'_{j,r} = P_{j,r} + \beta \frac{O^*_{j,r}}{|O_{j,r}|^2_{max}} (\psi'_{j,r} - \psi_{j,r}),$$

where
each of $\alpha$ and $\beta$ is a predetermined parameter, $O_{j,r}^*$ represents a set of complex conjugates of all elements of the sample function $O_{j,r}$, and $P_{j,r}^*$ represents a set of complex conjugates of all elements of the light source function $P_{j,r}$.

3. The 3D imaging method of claim 1, wherein, for a first time step (D) is performed and when j=1, the sample function $O_{j,r}$ is a predetermined initial sample function, and the light source function $P_{j,r}$ is a predetermined initial light source function.

4. The 3D imaging method of claim 3, wherein, in step (E), the predetermined convergence condition includes that an error rate between the sample reconstruction function candidate obtained in a latest iteration and the sample function $O_{j,r}$ used in the latest iteration when j=1 is smaller than a predetermined threshold.

5. The 3D imaging method of claim 4, wherein the error rate is defined to be:

$$err = \frac{|O_m - O_{m-1}|}{|O_{m-1}|},$$

where err represents the error rate for an $m^{th}$ iteration, m is a positive integer, $O_m$ represents the sample reconstruction function candidate obtained in the $m^{th}$ iteration, and $O_0$ represents the predetermined initial sample function.

6. A three-dimensional (3D) imaging system using scanning-type coherent diffraction to reconstruct a 3D image for a sample object, said 3D imaging system comprising:

a light source movable on a movement plane that faces a surface of the sample object in a spacing direction, and operable to emit a coherent light beam toward the surface of the sample object while having a specific orientation;

a light source driver module configured to drive movement of said light source to N number of scanning positions on the movement plane one by one in a scanning manner, so that said light source, at each of the scanning positions, emits the coherent light beam toward the sample object while having the specific orientation to form a light spot on the sample object, thereby defining N number of light spot regions on the sample object that respectively correspond to the N number of the scanning positions, wherein N is a positive integer, and any adjacent two of the light spot regions partly overlap each other;

a two-dimensional (2D) photodetector disposed to detect, for the coherent light beam emitted by said light source at each of the scanning positions, diffraction of the coherent light beam that passes through the corresponding one of the light spot regions, so as to obtain N number of 2D diffraction data distributions that respectively correspond to the scanning positions, wherein the movement plane, the sample object and said 2D photodetector are arranged along the spacing direction;

a processor electrically connected to said 2D photodetector for receiving the 2D diffraction data distributions, and including:

a coordinate transformation module that is configured to use a mathematical coordinate transformation to map all data points of each of the 2D diffraction data distributions onto a 3D spherical coordinate system to generate a pair of spherical shells that are symmetric with respect to an origin of the 3D spherical coordinate system, and configured to present all data points on one of the spherical shells in a 3D Cartesian coordinate system of a reciprocal space, so as to obtain N number of 3D intensity distributions in the reciprocal space, each of the 3D intensity distributions corresponding to one of the scanning positions to which the 2D diffraction data distribution corresponds, and being represented as $I_{j,q}^{M}$ where j is an integer from 1 to N;

an iteration module configured to perform, for each value of j from 1 to N, an iteration based on a sample function $O_{j,r}$ that is related to a 3D structure of the sample object, a light source function $P_{j,r}$ related to a structure of the light spot regions, and the 3D intensity distributions that respectively correspond to the scanning positions, so as to obtain a sample reconstruction function candidate and a light source reconstruction function candidate that correspond to the iteration, wherein the iteration includes operations of (i) performing Fourier transform on a wave function $\psi_{j,r}$ to obtain a distribution data $\varphi_{j,q}$ for the reciprocal space, where the wave function $\psi_{j,r}$ is defined as a product of the sample function $O_{j,r}$ and the light source function $P_{j,r}$;

(ii) updating the distribution data $\varphi_{j,q}$ in terms of amplitude based on one of the 3D intensity distributions $I_{j,q}^M$ that corresponds to the $j^{th}$ one of the scanning positions, so as to obtain an updated distribution data $\varphi'_{j,q}$;

(iii) performing inverse Fourier transform on the updated distribution data $\varphi'_{j,q}$ to obtain an updated wave function $\psi'_{j,r}$ for a real space;

(iv) obtaining an updated sample function $O'_{j,r}$ and an updated light source function $P'_{j,r}$ based on the sample function $O_{j,r}$, the light source function $P_{j,r}$ and the updated wave function $\psi'_{j,r}$;

(v) when $j \neq N$, repeating operations (i) to (iv) for a next value of j with the updated sample function $O'_{j,r}$ and the updated light source function $P'_{j,r}$ respectively serving as the sample function $O_{j,r}$ and the light source function $P_{j,r}$ for operation (i) in the repetition of operations (i) to (iv); and (vi) when $j=N$, making the updated sample function $O'_{j,r}$ and the updated light source function $P'_{j,r}$ obtained in operation (iv) for $j=N$ respectively serve as the sample reconstruction function candidate and the light source reconstruction function candidate of the iteration;

a convergence determination module configured to determine whether the sample reconstruction function candidate satisfies a predetermined convergence condition, to, upon determining that the sample reconstruction function candidate does not satisfy the predetermined convergence condition, cause said iteration module to repeat the iteration with the sample reconstruction function candidate and the light source reconstruction function candidate respectively serving as the sample function $O_{j,r}$ and the light source function $P_{j,r}$ for operation (i) in the repetition of the iteration, and to, after determining that the sample reconstruction function candidate satisfies the predetermined convergence condition, make the sample reconstruction function candidate serve as a sample reconstruction function that is a phase-retrieval sample function; and a reconstruction module configured to execute a predetermined 3D graphics program to generate, based on the sample reconstruction function, a 3D envelope curved surface that corresponds to a specific value included in the sample reconstruction function, and that serves as a 3D reconstruction image of the sample object; and a display module electrically connected to said processor, and operable by said processor to display the 3D reconstruction image.

7. The 3D imaging system of claim 6, wherein, in operation (ii), one of the 3D intensity distributions $I_{j,q}^M$, the distribution data $\varphi_{j,q}$ and the updated distribution data $\varphi'_{j,q}$ have a relationship of:

$$\varphi'_{j,q} = \sqrt{I_{j,q}^M} \frac{\varphi_{j,q}}{\sqrt{I_{j,q}}},$$

where $\sqrt{I_{j,q}}$ represents amplitude information of the distribution data $\varphi_{j,q}$;

wherein, in operation (iv), the updated sample function $O'_{j,r}$ is defined to be:

$$O'_{j,r} = O_{j,r} + \alpha \frac{P^*_{j,r}}{|P_{j,r}|^2_{max}} (\psi'_{j,r} - \psi_{j,r}),$$

and
the updated light source function $P'_{j,r}$ is defined to be:

$$P'_{j,r} = P_{j,r} + \beta \frac{O^*_{j,r}}{|O_{j,r}|^2_{max}} (\psi'_{j,r} - \psi_{j,r}),$$

where
each of $\alpha$ and $\beta$ is a predetermined parameter, $O_{j,r}^*$ represents a set of complex conjugates of all elements of the sample function $O_{j,r}$, and $P_{j,r}^*$ represents a set of complex conjugates of all elements of the light source function $P_{j,r}$.

8. The 3D imaging system of claim 6, wherein, for a first time the iteration is performed and when $j=1$, the sample function $O_{j,r}$ is a predetermined initial sample function, and the light source function $P_{j,r}$ is a predetermined initial light source function.

9. The 3D imaging system of claim 8, wherein the predetermined convergence condition includes that an error rate between the sample reconstruction function candidate obtained in a latest iteration and the sample function $O_{j,r}$ used in the latest iteration with $j=1$ is smaller than a predetermined threshold.

10. The 3D imaging system of claim 9, wherein the error rate is defined to be:

$$err = \frac{|O_m - O_{m-1}|}{|O_{m-1}|},$$

where err represents the error rate for an $m^{th}$ iteration, m is a positive integer, $O_m$ represents the sample reconstruction function candidate obtained in the $m^{th}$ iteration, and $O_0$ represents the predetermined initial sample function.

* * * * *